US005537494A

United States Patent [19]

Toh

[11] Patent Number: 5,537,494

[45] Date of Patent: Jul. 16, 1996

[54] VIDEO IMAGE DATA ENCODING AND COMPRESSION SYSTEM USING EDGE DETECTION AND LUMINANCE PROFILE MATCHING

[75] Inventor: Peng S. Toh, London, Great Britain

[73] Assignee: Axiom Innovation Limited, London, Great Britain

[21] Appl. No.: 391,834

[22] Filed: Feb. 17, 1995

Related U.S. Application Data

[63] Continuation of Ser. No. 966,180, Jan. 29, 1993, abandoned.

[30] Foreign Application Priority Data

| | | | |
|---|---|---|---|
| May 29, 1990 | [GB] | United Kingdom | 9011908 |
| Dec. 31, 1990 | [GB] | United Kingdom | 9028204 |

[51] Int. Cl.$^{6}$ ..... H04N 1/41; G06T 9/00

[52] U.S. Cl. ..... 382/242; 382/274; 358/429

[58] Field of Search ..... 382/56, 20–23, 382/232, 241, 242, 197, 199, 274; 358/428, 429

[56] References Cited

U.S. PATENT DOCUMENTS

| | | | |
|---|---|---|---|
| 4,772,947 | 9/1988 | Kono | 382/56 |
| 4,910,786 | 3/1990 | Eichel | 382/22 |
| 4,973,111 | 11/1990 | Haacke et al. | 324/309 |
| 5,016,173 | 5/1991 | Kenet et al. | 382/22 |
| 5,073,958 | 12/1991 | Imme | 382/22 |
| 5,081,689 | 1/1992 | Meyer et al. | 382/22 |
| 5,148,501 | 9/1992 | Enomoto et al. | 382/56 |
| 5,204,920 | 4/1993 | Moran et al. | 382/22 |

OTHER PUBLICATIONS

Kunt, Murat "Recent Results in High–Compression Image Coding" IEEE Transactions on Circuits & Systems v34 #11, Nov. 1987 pp.1306–1336.

Marshal, "Application of Image Contours to Three Aspects of Image Processing: Compression, Shape Recognition, and Stereopsis" IEE Proceeding [Communications Speech and Vision] v139 #1 p. 1–8, Feb. 1992.

Ma, "A Novel Image Sequence Coding Scheme" IEEE International Conference on Systems Engineering. p. 15–18, Aug. 1989.

*Primary Examiner*—Joseph Mancuso
*Assistant Examiner*—Larry J. Prikockis
*Attorney, Agent, or Firm*—Pollock, Vande Sande & Priddy

[57] ABSTRACT

An image processing system which processes image data on a line by line basis. Edges in the images are detected as discontinuities in intensity. The intensity profile between detected edges is determined and matched to a polynomial function. Data representing the detected edges and data relating to the detected profile are stored as a data set for further processing. The data set for one image may be compared to that for another similar image in order to match features between images and thereby produce three-dimensional information about a scene.

9 Claims, 4 Drawing Sheets

VIDEO CAMERA
2
SMOOTH
3
EDGE DETECTOR
4
SECOND STORE (EDGE MAP)
6
1
FIRST STORE (SHADING)
5
DATA PROCESSOR AND OUTPUT MEANS
7
ENCODED DATA

```
Procedure Recover_shade
Begin
  row_number:=0
  While row_number<=total_number_of_row do
  begin
     Repeat
       begin
         Intensity
         :=Polynomial(order_of_polynomial,
          coefficient_of_polynomial,x);
       end
     Until last_segment
     row_number:=row_number+1
  end
End
```

FIG. 7

```
Procedure Extract_Edge_Only
Begin
  row_number:=0
  While row_number<=total_number_of_row do
  begin
      x:=end_coordinate;/*of current segment*/
      if x=end_of_column;
         row_number:=row_number+1;
      else
         edge_coordinate:=(x,row_number);
  end
End
```

FIG. 8

VIDEO IMAGE DATA ENCODING AND COMPRESSION SYSTEM USING EDGE DETECTION AND LUMINANCE PROFILE MATCHING

This application is a continuation of application Ser. No. 07/966,180 filed Jan. 29, 1993, now abandoned.

The invention relates to image data encoding and compression.

In image processing systems raw image data input from an image source such as an electronic camera is preprocessed to provide a higher level representation of the image before the image is analysed. The raw image is said to be at the lowest level and the level of representation increases as the degree of abstraction increases.

In the art of artificial intelligence, machine vision and the like a great deal of work has been done in processing image data to identify sharp intensity changes or intensity discontinuities. One of the most notable developments in this field is the so-called primal sketch which resulted from work carried out by Marr and Hildreth as disclosed in their paper "Theory of Edge Detection" Prc. R. Soc. London, 13207, 187–217, 1980. However, very little work has been done in other areas such as the representation of shading in an image. Accordingly processed image data has not necessarily contained a maximum amount of information about a scene and thus has resulted in analyses being carried out on incomplete data.

Stereo vision and depth perception are characterised by matching corresponding primitives across two or more disparate views of the same scene. Only if the corresponding primitives can be successfully matched, can depth be perceived. It is recognised that correspondence matching is one of the major problems in stereo vision but, in spite of this major difficulty, stereo vision remains very attractive. This is because stereopsis derives absolute depth or 3 dimensional information through triangulation. In contrast, monocular techniques, in which the correspondence problem can be avoided, can only provide relative depth information and thus there is insufficient information to describe fully the scene.

There are three major approaches to stereo matching namely structure matching, feature matching and intensity based matching. The distinction between these approaches is the choice of primitive rather than the method of matching since the method of matching is generally dependent upon the choice of primitive. Each of the three methods undergo differing degrees of pre-processing in order to obtain a desirable primitive representation of the image. Intensity or area-based matching involves almost no pre-processing other than perhaps image smoothing. In contrast, deriving the structure of a scene involves a higher degree of abstractions.

Structural matching, also known as high level or relational matching, uses high-level features such as regions, bodies or the relationship between features as a matching primitive. High-level features have some kind of semantic description of the object and can be represented in various forms such as graphs, stars, networks and circuits. The distinctive characteristic of these representations is the existence of a hierarchical structure. For example, one known approach is to group high-level features into a hierarchical structure comprising bodies, surfaces, curves, junctions and edgels. The body feature is the highest level and is formed by several surfaces located in the hierarchy one level below. Surfaces are formed by curves and junctions. The lowest level consists of edgels which make up the curves and junctions. The highest level in a structure, in this example the body, has the most distinctive attributes and should result in a less ambiguous match. Matching is then traversed down the hierarchy until the lowest level is reached. A star structure approach can be used to define at a node the relationship with all neighbouring nodes including the node itself plus all the links to the neighbouring nodes. The advantage of structural matching as a whole is the ability to avoid local mismatches and this leads directly to a meaningful 3D description of the scene. Views with larger separations and transformations are more likely to be matched using structural matching than they are using other primitives.

Feature matching starts from the basis that correspondence cannot take place at all points in the image and can only be applied to those points which can be identified without ambiguity in the two images. Features are usually detected by the application of "interest" operators such as those proposed by Moravec or edge detectors such as those proposed by Marr and Hildreth. Stereo matching using features results in a huge reduction of matching candidates and the result obtained from matching can be further improved by extensive operations to remove ambiguities, such as figural continuity for edges. However, feature based stereo analysis produces only a sparse depth map and this is often regarded as the techniques main drawback.

Intensity based matching has, despite many arguments against it, enjoyed some success. One known method of intensity matching is an application of a statistical paradigm of combining independent measurements. Many measurements are combined statistically to produce a more robust indication of correspondence than is possible with fewer measurements. In short, the improvement arises from the association of more attributes to each matching primitive. However, the intensity based method is generally more time-consuming due to the vast numbers of matching candidates and one of the major setbacks is its inability to handle homogeneous or uniform brightness areas. These areas do not have gray level variation which is essential to correlation measurement. Another disadvantage is the need to define a local area in which correspondence is sought. The size of the local area, usually in the form of a correlation mask, is crucial to the method and yet it is always chosen arbitrarily.

Methods have also been developed that match both edges and intensity. An example of one such method is that developed by Baker and Binford. The Baker and Binford method first matches edges and false matches are then made unambiguous by a global connectivity check. After having obtained the edge disparities, the disparities are then used as references to carry out the intensity correlation. This method produces dense results and adheres to two distinct steps of local matching followed by a global refinement step.

SUMMARY OF THE INVENTION

The present invention resides in the realisation that an image can be represented by combined edge and shading data. As such, the invention enables encoded data to be processed directly without the need first to reconstruct the image and thus offers significant advantages in terms of processing overheads.

According to one aspect of the invention there is provided an image processing system in which an acquired image is processed to identify edges in the image and to represent the intensity profile of image portions between detected edges as a respective mathematical expression thereby to reduce the amount of data used to define the image.

According to another aspect of the invention there is provided an image processing system comprising an image source for supplying digital electronic image data, an edge detector for detecting edges in the supplied image and for creating an edge map therefrom, and an integrating processor for combining in the edge map data mathematical expressions representing the intensity of image portions between the detected edges, thereby to reduce the amount of data defining the image.

According to a further aspect of the invention there is provided a method of encoding data representing an image, the method comprising smoothing initial image data to suppress noise and fitting a continuous equation to image intensity profile portions bounded by abrupt intensity changes.

Furthermore, the invention provides a multiple view vision system in which features in different images representing a scene viewed from different respective locations are marked by comparing one set of encoded data representing intensity profiles for image portions defined between abrupt intensity changes in one image with a similar set of data representing another image.

Moreover, the invention provides a system for processing image data, the system comprising acquiring means for acquiring at least one image, first storing means for temporarily storing data representing the acquired image, detecting means for detecting edges in the acquired image, defining means for defining intensity profiles between the detected edges as respective mathematical expressions on an image line by line basis.

Thus, the present invention aims to produce a signature which combines feature and non-feature points whenever possible in an image. In this respect, a feature point may be regarded as an active element representing an abruptly changing feature such as an edge and a non-feature point may be regarded as a picture element representing, together with other picture elements in its vicinity, a slowly changing feature such as a change in surface shade. An advantage of using feature points in that they provide, as it were, rigid terminals or anchors between which non feature points may be defined as additional image attributes.

The above and further features of the invention are set forth with particularity in the appended claims and together with advantages thereof will become clearer from consideration of the following detailed description of an exemplary embodiment of the invention given with reference to the accompanying drawings.

DESCRIPTION OF THE FIGURES

In the drawings:

FIG. 7 is an image restoration algorithm;

FIG. 8 is an image edges decompressing algorithm.

DESCRIPTION OF THE PREFERRED EMBODIMENT

Before describing the embodiment, reference is made to the adaptive vision based controller disclosed in international patent application no. WO 89/01850 now commonly assigned, the teachings of which are incorporated herein by reference. It should be noted that the embodiment to be described can be incorporated into said controller or indeed into any other suitable machine vision system as required.

Figure 1:
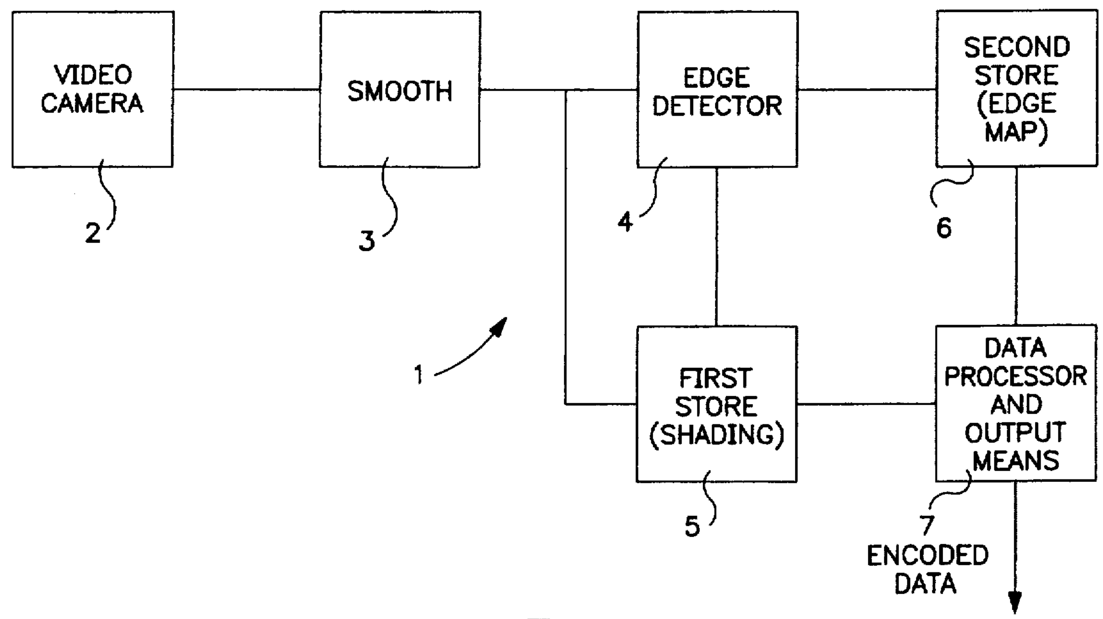
FIG. 1 is a schematic view of a system according to the invention.

Turning now to FIG. 1 of the accompanying drawings there is shown an image data encoding and compression system 1. Image data from an image source 2 which may be an electronic camera for example is input to a smoothing circuit 3. Encoding is carried out in two stages. In the first of these stages the image data is smoothed to suppress noise, and edges are detected by an edge detector 4. In the second stage, as will be described in greater detail hereinafter, a polynomial is fitted to shading information between detected edges, which information is held in a shading store 5.

First, the image data is subjected to smoothing by the smoothing circuit 3. The smoothing circuit 3 uses a standard convolution such as a Gaussian convolution to suppress noise such as spikes or other glitches in the incoming image data. The smoothing circuit 3 delivers the smoothed image to the edge detector 4 which is arranged to detect edges as sharp intensity changes or discontinuities using any suitable known method of edge detection. Global or two dimensional edge detection is preferred though linear scan line or one dimensional edge detection can instead be used. The reason why one dimensional edge detection can be used is that, as will become clearer from the description that follows, the encoding technique only preserves non-horizontal edges, assuming a horizontally scanned image raster, and does not preserve horizontal edges.

The edge detector 4 outputs an edge map which represents edges detected in the image and which is held in any suitable store 6. Once the edge map has been created it is used by an data processor (integrator) 7 to define boundaries or anchor points in the image. These anchor points define positions in the image between which a polynomial function can be fitted to the shading profile of the image. The polynomial function is preferably obtained by least square fitting to the shading profile.

Figure 2A:
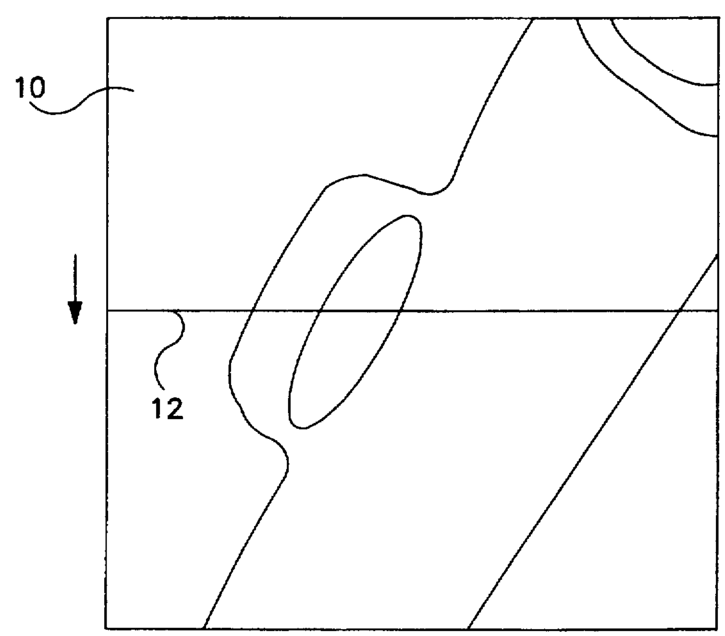
FIG. 2 shows a) an image portion and b) an intensity profile associated with the image portion.
Figure 2B:
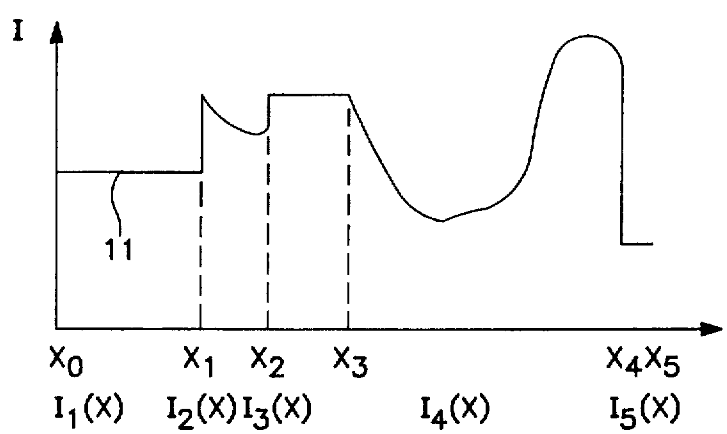

FIG. 2 of the accompanying drawings shown (a) an exemplary image 10 and (b) an exemplary intensity profile 11 along a horizontal scan line 12 in the image 10. The image 10 includes edges 13 which are detected by the edge detector 4 and areas of shading, ie. varying or constant intensity between the edges 13. As can be seen from FIG. 2, points on the line 12 corresponding to edges 13 in the image, are seen as discontinuities at $X_o$, $X_1$, $X_2$, $X_3$, $X_4$ and $X_5$ in the intensity profile 11. Between these points the intensity profile is constant or continuously and smoothly varying. The intensity profile portions between $X_0$ and $X_1$, and between $X_1$ and $X_2$, and so on can each be represented by a polynomial equation represented in FIG. 2 as $I_1(x)$, $I_2(x)$, $I_3(x)$, $I_4(x)$ and $I_5(x)$.

There are several advantages in employing a polynomial function in the definition of intensity profile between two edges. Firstly, a polynomial can approximate to a large number of pixels using only a few parameters. Secondly, least-square fitting with a polynomial reduces noise, such as interference spikes and camera noise. Furthermore, very slight intensity variations due to surface texture, which are of course undesirable, are also removed. Thirdly, a polynomial fit is easily implemented by numerical algorithms on any suitable computer or image processor.

Nevertheless, the application of a polynomial least-square method is not without difficulties. The intensity profile along the entire length of a scanline is a complex curve, and this curve cannot be represented simply by a polynomial. However, the present embodiment overcomes this problem by segmenting the scan line into several low order polynomials which are preferred because of their stability. The joints between these segments correspond to edges in the image and therefore correspond also to discontinuities in the intensity profile of the image. This ensures that the low order fitted polynomial will be accurate because there will be no discontinuities within the segment of the intensity profile to which the polynomial function is being fitted. Since the polynomial function is fitted strictly to the profile in-between edge points, the condition of smoothness can be well satisfied.

Each intensity profile portion is approximated by a polynomial function $I_i(x)$ as follows:

$$I_i(x) = a_0 + a_1x + a_2x^2 + \ldots = \sum_{O}^{N} a_n x^n$$

for the sample points $x_0$ to $x_5$ in each portion.

Thus, each line in the image is expressed as a collection of edge coordinates $x_1 \ldots x_5$ for example interleaved with polynomial or other continuous equations defining the intensity profile between consecutive edge coordinates. Once the image data has been reduced to this form it can be used in a wide range of different image processing applications.

In many if not all hitherto known encoding schemes it is necessary to reconstruct the image from the encoded data before further analysis can be done. The present encoding scheme makes it unnecessary in many cases to reconstruct the image and this is a significant advantage in terms of increased processing speed etc. For example, if an edge map for say a part of the image is required for use in say feature matching in stereo analysis, the map can quickly be constructed from the encoded data simply by reading the edge coordinate data $x_1 \ldots x_5$. Indeed, in some circumstances it will be possible to dispense with any form of image reconstruction and to work instead exclusively on the encoded data.

For example, consider a stereo matching system in which one view of a scene includes a profile portion $$I_1(X_1) = a_0 + a_1x_1 + a_2x_1^2 + \ldots = \sum_{O}^{N} a_n x_1^1 \tag{1}$$

for $x_{l0}$ to $x_{ls}$ sample points, and another view of the scene includes a profile portion $$I_2(x_r) = b_0 + b_1x_r + b_2x_r^2 + \ldots = \sum_{O}^{N} b_n x_r^n \tag{2}$$

for $x_{ro}$ to $x_{rt}$ sample points.

The number of samples involved in generating $I_i$ and $I_j$ is usually different ie. s≠t. The independent variables $x_l$ and $x_r$ denote the horizontal coordinates of the left and right images respectively.

Since the left and right segment profiles are largely the same for Lambertian surfaces $$I_1(x_l)=I_2(x_r) \tag{4}$$

and we let geometrical transformation of the left and right images to be related by $$x_r=h(x_l) \tag{5}$$

which can also be represented by a polynomial $$h(x_1) = \sum_{j=0}^{M} d_j x_1^j \tag{6}$$

Since most surfaces can be approximated by a quadratic function, up to a second order function for $h(x_l)$ is sufficient.

Given different choices of $h(x_l)$, a match is established if the criterion function $$\sum_{x \in R} \{I_1(x_1) - I_2(h(x_r))\}^2$$

is minimised.

Figure 3:
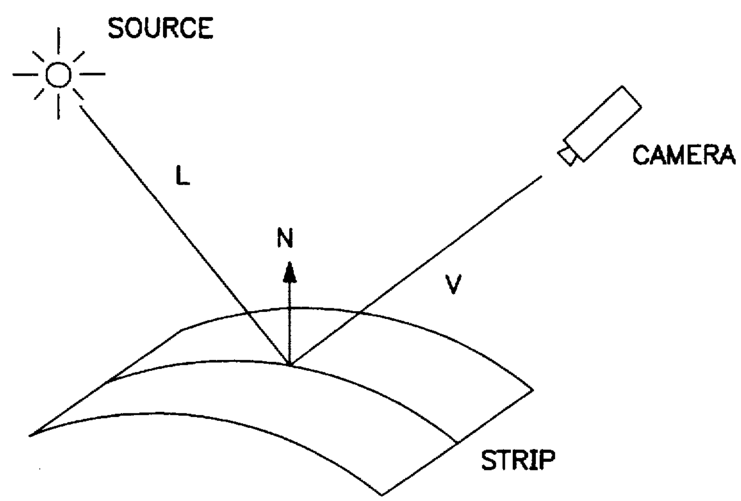
FIG. 3 illustrates image geometry.

Another example of the use to which the encoded data can be put is qualitative shape analysis. It is will be assumed that the objects in the scene have near lambertian reflectance (ie. substantially diffuse reflection as opposed specular reflection) and that the change in observed intensity is negligible with respect to the viewing angle. As shown in FIG. 3 of the accompanying drawings, the intensity I of a Lambertian surface 30 under orthogonal projection is given by $$I=S\rho(N \cdot L)$$

where ρ is the surface albedo and is constant across a strip 31 on the surface 30 because any discontinuity in p also appears as intensity discontinuity and would be detected by the edge detector;

S is the intensity of the incident light whose variation across the strip is negligible;

and N and L are the space vectors of the normal of the surface orientation and the direction of the incident light respectively. The dependency of the expression on image coordinate space is omitted for the sake of clarity. The intensity I and the surface normal N are different along the strip. The curvature of the strip is given by the derivative of the surface normal along the scanline direction and can be related to the derivative of the intensity as follows:

$$dI=\rho S(dN \cdot L)+\rho S(N \cdot dL)$$

since L is from a distant light source, its variation across the strip is extremely small, and therefore dI can be approximated to $$dI=\rho s\ dN$$

Similarly, the second derivative of intensity $d^2I$ can be approximated to $$d^2I=\rho S\ d^2N$$

It will therefore be appreciated that the intensity derivatives dI and $d^2I$ correspond to the order of the curvature of the strip 31. If the strip 31 has a planar curvature, dN is constant and therefore dI is also constant. It follows that the second and higher intensity derivatives will be zero for a planar surface. If however, a strip has a surface which is defined by a second order polynomial, then $d^2I$ will not be zero. It follows that if $d^2I$ is not zero the strip is non-planar.

Thus it is possible to classify the curvature of a strip as planar or non-planar based on the polynomial representation of the strip. Under normal lighting conditions, where the light source has both ambient and directional components shading will be caused by the directional component of the source. Ambient light is uniform or diffuse and will not contribute to shading. With surface shading, the curvature of a surface along an axis, eg its x axis, can be estimated and since the polynomial representation incorporates photometric information relating to the strip, the strip can be used directly for shape analysis. Having knowledge about the shape of the surface will enhance the general disparity function to apply the appropriate order and thus the most important use of this preprocessing step is to classify a strip as either planar and non-planar.

Figure 4:
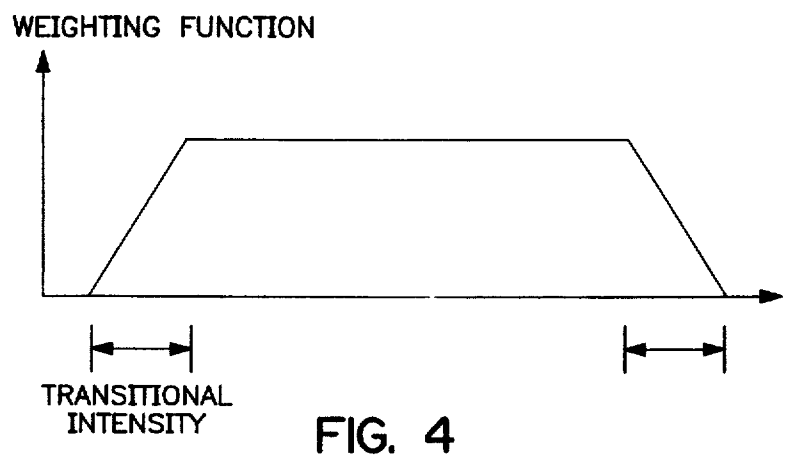
FIG. 4 shows a weighting function for de-emphasising edges.

In order to use the polynomial representation of the combined profile for curvature classification, the polynomial representation is extracted from the image using a trapezoidal weighting function, as shown in FIG. 4. The purpose of this weighting function is to suppress the influence of sudden changes in intensity at edges in the image. To this end, the weighting function is maximum in a central area between edges and tapers to a minimum in the vicinity of detected edges. This weighting function is first applied to the intensity profile and a suitably adjusted polynomial representing the profile is then calculated as previously or as a product of the weighting function and a previously calculated polynomial.

Once the weighted polynomial has been extracted, the classification criterion for classifying a surface as planar or non-planar is very simple. Any strip with an intensity profile represented by polynomial order higher than one is non-planar, and a strip is planar if its polynomial order is less than or equal to one. Local shading analysis suggests that a planar curve is one whose second order derivative is zero, or equivalently, the intensity is at most first order.

This technique of matching planar strips can be extended to deal also with non-planar surfaces in a scene. It is possible to estimate the function relating to the foreshortening of a non-planar surface strip by replacing the assumption $x_r=cx_l$ with the assumption $$x_r=h(x_l)$$

It can be shown that $$h(X_p)=I_2^{-1}I_1(X_p)$$

This equation involves finding the inverse of $I_2$ which is not a trivial exercise. In practice it is also necessary to consider the effect of noise and so a minimisation approach is therefore instead adopted.

It can be shown that $$\frac{\partial x^2}{\partial d_j} = \sum_{x\in R}\left\{\left[\sum_{n=0}^{N} a_n x^n - \sum_{n=0}^{N} b_n\left(\sum_{j=0}^{M} d_j x^j\right)n\right]\sum_{n=0}^{N} b_n n\left(\sum_{j=0}^{M} d_j x^j\right)n-1\sum_{j=0}^{M} x^j\right\} = 0 \quad (17)$$

This equation can be solved by breaking it down into several stages. First of all, $x_r$ is solved given $x_1$ by successive approximation within a small neighborhood in accordance with the equation $$x_r=x_l+\delta x_l(x_l)-I_1(x_l))^2 \text{ is minimum for } x_0\leq x_p\leq x_l$$

The disparity at $x_p$ is then given by $\delta x_{l(xl)}$. Next, since the disparity function of the strip should also be smooth, therefore a polynomial $$\sum_{j=0}^{j=M} d_j x^j,$$

is used to fit $\delta x(x)$ at different samples of $x_p$.

There is one point to be considered while fitting this disparity function. Since the disparities of the edge points are more accurate than the non-feature points, they must be given more weights to constraint the least-square solution. An unbiased fit will not guarantee that the function passes through these end points. A weighting function in the form of an inverted trapezoid is therefore appropriate and it should be noted that this weighting function is the reverse to that for curvature analysis shown in FIG. 4 of the drawings.

Figure 5:
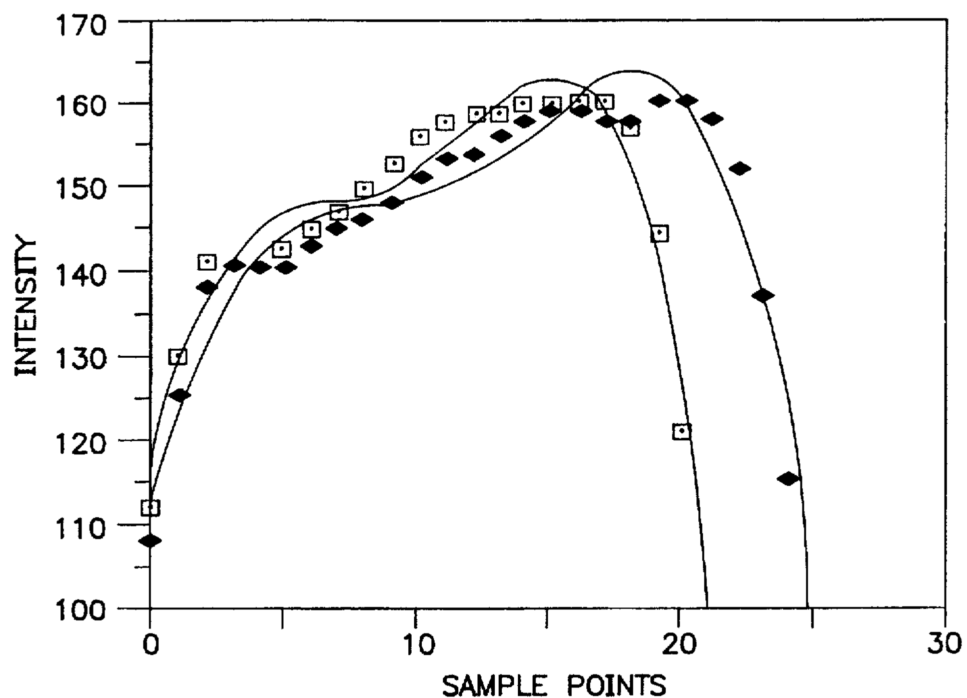
FIG. 5 shows corresponding intensity profiles in two differently viewed images of the same scene.

Another example of the use to which the encoded data can be put is quantitative shape analysis. When a surface in a scene is viewed from two different viewing positions there will be a difference in the geometry of the surface between the two views and this will result in a different intensity profile polynomial being defined for the same feature in the two different views. An example of this effect is shown in FIG. 5 of the accompanying drawings. It is possible from the image geometry to calculate a function relating the planar surface between the two images and it can be shown that $$x_r=cx_l+d \quad (3)$$

where $$c=\frac{t+1}{s+1}$$

and t=no of pixels in $x_r$ s=no of pixels in $x_l$

From equations 1, 2 and 3 above it can be shown that $$c=\sqrt[n]{\frac{a_n}{b_n}}$$

It is unrealistic to expect all coefficient ratios to be identical and so instead, the system is arranged to accept the two equations (1) and (2) for a planar surface to be matched if the following equation is satisfied.

$$|a_n-b_nc^n|\leq\epsilon \quad (4)$$

Where $\epsilon$ is a preset threshold.

Figure 6:
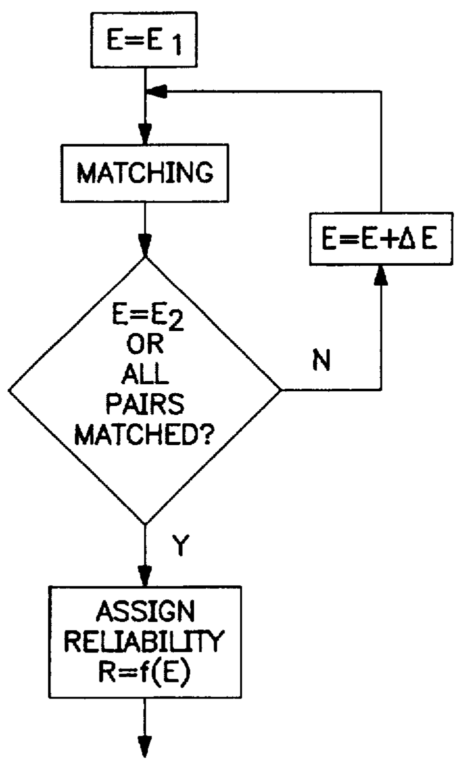
FIG. 6 is a flow diagram of a multiple pass matching technique.

The need for the setting the an appropriate value of threshold $\epsilon$ for the matching criterion function as discussed in relation to equation 4 can be eliminated using a multiple pass algorithm such as is shown in FIG. 6 of the accompanying drawings.

As can be seen from FIG. 6, a small threshold $\epsilon_1$ is first chosen for matching candidates along the scanline. This sets a very strict test to be passed and under such stringent criterion, very few pairs of matches will normally occur. The value of the threshold $\epsilon$ is then progressively relaxed for subsequent passes of matching for the same scanline until an upper limit $\epsilon_2$ is reached, or all candidates are matched. The reliability of the matching varies with the value of the threshold $\epsilon$. For instance, a smaller threshold will produce a more reliable result and a reliability factor can thus be assigned to the matched result and this will facilitate further refinement if required.

It is of course often desirable to be able to reconstitute the image in the form after filtering by the smoothing circuit 3. The procedure for decoding the entire image is shown as an alogorithm in FIG. 7 of the accompanying drawings. The reconstruction represented by this algorithm proceeds line by line with the function "polynomial" reconstructing the intensity profile for each point on the line between edge points.

Alternatively the edge map only may be reconstituted by way of the algorithm shown in FIG. 8 of the accompanying drawings.

Having thus described the present invention by reference to a preferred embodiment it is to be understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A video image data encoding and compression system comprising:

an electronic video camera for providing digital image data corresponding to a scene viewed by the camera;

a first store coupled to the camera output for storing said digital image data;

an edge detector coupled to the camera for processing said digital image data to detect edges in the image data as sharp image luminance changes or discontinuities, said edge detector outputting digital edge map data representative of edges detected in the digital image data;

a second store coupled to the edge detector output for storing said digital edge map data;

a data processor coupled to said first and second stores and responsive to said digital image data and said digital edge map data for matching representative polynomial functions to segments of detected image luminance data extending from ones of said edges to adjacent ones of said edges; and means for outputting said digital edge map data together with digital data representative of said polynomial functions.

2. A system as claimed in claim 1, wherein said data processor applies a weighting function to said digital image data between the respective edges in order to match a representative polynomial function thereto.

3. A system as claimed in claim 1, further comprising smoothing means for processing said digital image data to remove noise therefrom, prior to supply of said data to said first store and to said edge detector.

4. A system as claimed in claim 3, in which said smoothing means applies a Gaussian convolution to the digital image data.

5. A system as claimed in claim 1, in which said representative polynomial functions are calculated by a least squares fitting to the respective segments of luminance data.

6. A system as claimed in claim 1, in which the digital image data is processed on a line by line basis.

7. A system according to claim 1, including a video image data encoding and compression system.

8. A system as claimed in claim 7, in which features in different images representing a scene viewed from different respective locations are matched by comparing one set of encoded digital data representing segments of luminance data for image portions defined between edges in one of said different images with a similar set of digital data representing another of said different images.

9. A system as claimed in claim 1, further comprising reconstructing means for reconstructing an image from said digital edge map data, and said digital data representative of said polynomial functions, and display means for displaying the reconstructed image.

* * * * *